United States Patent [19]

Kamp et al.

[11] 3,735,682

[45] May 29, 1973

[54] STRIP METERING MECHANISMS FOR ADVANCING FILM IN A FILM PACK

[75] Inventors: Leonard F. Kamp, Rochester; William P. Ewald, Webster, both of N.Y.

[73] Assignee: Eastman Kodak Company, Rochester, N.Y.

[22] Filed: June 24, 1971

[21] Appl. No.: 156,253

[52] U.S. Cl. ............... 95/31 FM, 95/31 R, 226/127, 242/57
[51] Int. Cl. .............................................. G03b 17/18
[58] Field of Search ........................ 242/57; 33/136; 95/13, 31 FM; 226/127, 128, 129

[56] References Cited

UNITED STATES PATENTS

| | | | |
|---|---|---|---|
| 2,557,297 | 6/1951 | Lea | 95/60 X |
| 3,324,778 | 6/1967 | Everett | 95/34 R |
| 3,682,065 | 8/1972 | Ewald | 95/31 FM |
| 2,935,004 | 5/1960 | Eburn | 95/13 |
| 3,148,605 | 9/1964 | Peterson | 95/31 FM |
| 1,535,930 | 4/1925 | MacDonald | 95/31 FM |

*Primary Examiner*—George F. Mautz
*Assistant Examiner*—Edward J. McCarthy
*Attorney*—William T. French, Robert F. Crocker and Steve W. Gremban

[57] ABSTRACT

Strip metering mechanisms for successively advancing predetermined increments of film from a roll of film in a film pack adapted for use in a camera of the instant processing type. Such cameras use conventional film packs and do not have a film roll advancing facility. The metering mechanisms comprise a metering strip coupled to a roll of film and adapted when pulled out of the camera a predetermined increment to actuate an audio signal generating device or to lock the film and/or strip to prevent further film advance. The audible signal or strip and/or film lock-up is achieved by notches and ramps in the strip and/or film which actuate the audio signal generating mechanism or the strip and film locking mechanism. The signal is generated, or the strip and/or film locked at the instant that the film has been advanced sufficiently to locate a predetermined increment of film in a correct exposure position.

10 Claims, 5 Drawing Figures

PATENTED MAY 29 1973 3,735,682

LEONARD F. KAMP
WILLIAM P. EWALD
INVENTORS

BY Steve W. Grombow

ATTORNEY

LEONARD F. KAMP
WILLIAM P. EWALD
INVENTORS

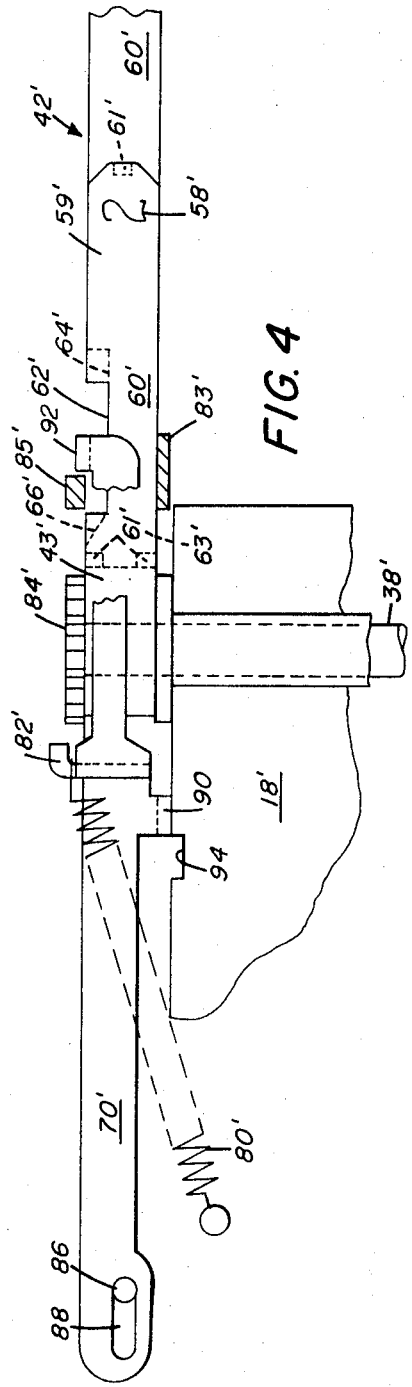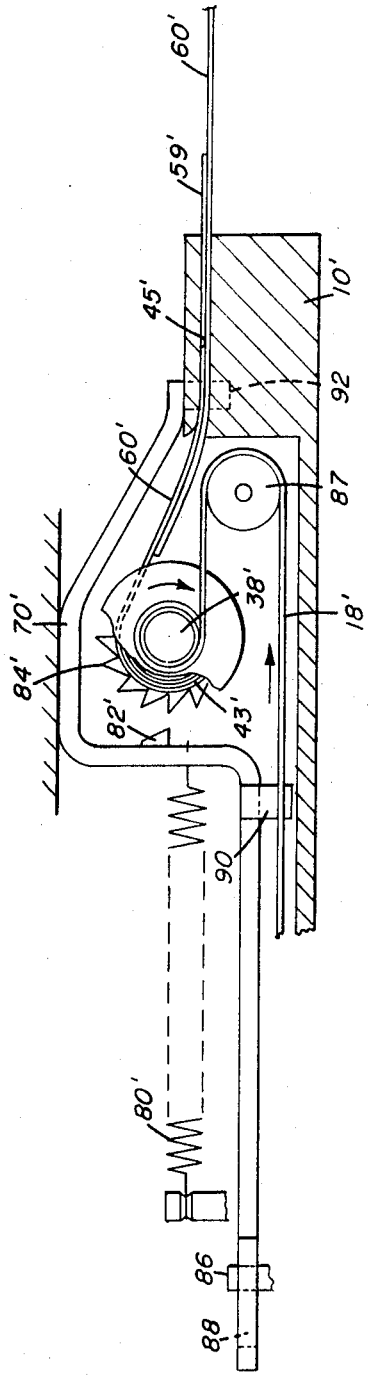

STRIP METERING MECHANISMS FOR ADVANCING FILM IN A FILM PACK

CROSS REFERENCE TO RELATED APPLICATIONS

Reference is made to commonly assigned copending U.S. patent application Ser. No. 35,784, entitled "Photographic Film Pack," filed in the name of William P. Ewald, and U.S. patent application Ser. No. 156,252, entitled "Combined Film Pack and Strip Metering Mechanism for Advancing Film," filed in the names of Leonard F. Kamp and William P. Ewald.

BACKGROUND OF THE INVENTION

1. Field of the Invention

This invention relates generally to film advancing and metering mechanisms for cameras or the like, and more specifically to strip metering mechanisms for successively advancing predetermined increments of film from a roll of film in a film pack or the like.

2. Description of the Prior Art

Cameras of the instant processing type which use film packs are well known in the art. Such cameras are adapted to receive conventional film packs of the type which are insertable into the camera. Such film packs normally comprise an assemblage of film units, each unit comprising a photosensitive sheet and a print receiving sheet in which a leader is attached to each film unit at a position spaced from the leading end of the film unit. The leader protrudes from the camera and is pulled to advance the leading end of the first film unit between pressure applying members. At this point, the leader detaches from the film unit and the leading end of the film unit is manually grasped and pulled for advancing the film unit through the pressure applying members. This advances the succeeding film unit to an exposure position with a portion of its leader protruding from the camera. Since such cameras use film packs of the described type, they do not need and hence do not have a window in the back of the camera through which numbers on a film can be viewed. In addition, such cameras do not need and hence are not equipped with means for advancing film from a supply roll of film to a take-up spool. Accordingly, in order to adapt such cameras to handle a film roll and take-up spool, it is necessary to solve the problem of how to advance and meter the film to locate successive unexposed increments of the film in a correct position for exposure. One solution to this problem is presented in film packs described in the aforementioned copending patent applications Ser. No. 35,784, now U.S. Pat. No. 3,682,065 and Ser. No. 156,252. This application is directed to another solution involving strip metering mechanisms for advancing successive increments of film in roll form from a film pack or the like.

SUMMARY OF THE INVENTION

This invention includes within its scope strip metering mechanisms preferably embodied in a film pack for successively advancing film in predetermined increments in an instant processing camera having neither a film advancing mechanism nor a viewing window through which indicia on a film backing paper may be seen or viewed. The film pack has a roll film supply and take-up spool and a film advancing mechanism comprising a metering strip coupled to the film. In one embodiment of the invention, the metering strip actuates an audible signal generating mechanism which indicates by an audible signal that the film has been advanced a proper predetermined increment for an exposure. In another embodiment of the invention, the metering strip actuates a locking mechanism which locks the metering strip at the instant that the film has been advanced a proper predetermined increment for exposure. In still another embodiment of the invention, the metering strip and film actuate a locking mechanism for preventing further advance of the strip and film at the instant that the film has been advanced a predetermined increment for exposure.

It is therefore one of the objects of the present invention to provide a strip metering mechanism for actuating mechanisms to indicate that a predetermined increment of film has been advanced to a correct position for exposure.

Another object of the invention is to provide a strip metering mechanism that generates an audible signal at the instant that a predetermined increment of film has been advanced to a correct position for exposure.

Another object of the invention is to provide a strip metering mechanism for actuating a locking mechanism for preventing further advance of the strip and/or film at the instant that a predetermined increment of the film has been advanced to a correct position for exposure.

The invention and its objects and advantages will become more apparent from the detailed description of the preferred embodiments presented below.

BRIEF DESCRIPTION OF THE DRAWING

In the detailed description of the preferred embodiments of the invention presented below, reference is made to the accompanying drawings, in which:

FIG. 4 is a segmental top plan view illustrating still another embodiment of a strip metering mechanism of this invention in an unlocked position; and FIG. 5 is a side elevational view of the mechanism of FIG. 4.

DESCRIPTION OF THE PREFERRED EMBODIMENTS

Figure 1:
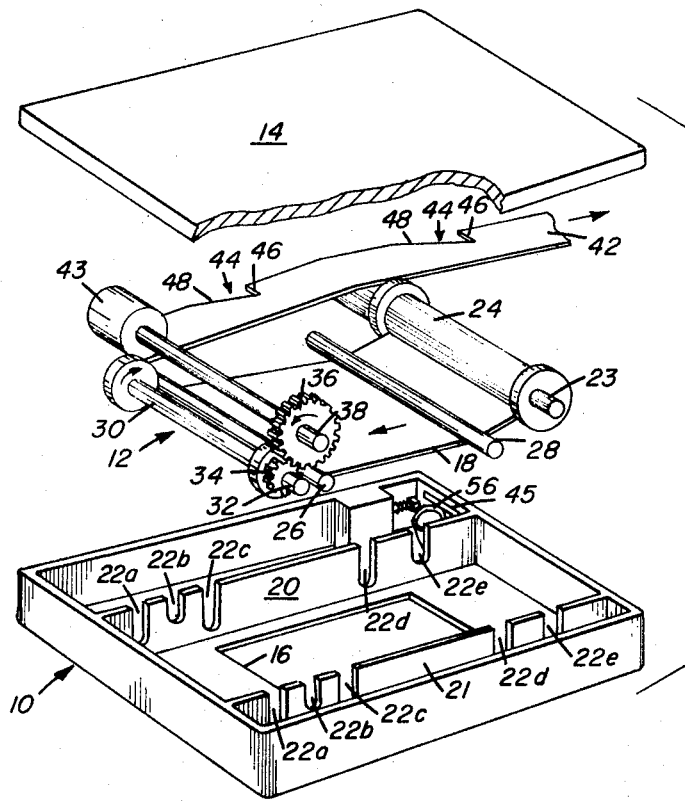
FIG. 1 is an exploded perspective view illustrating a film pack utilizing one embodiment of this invention.
Figure 2:
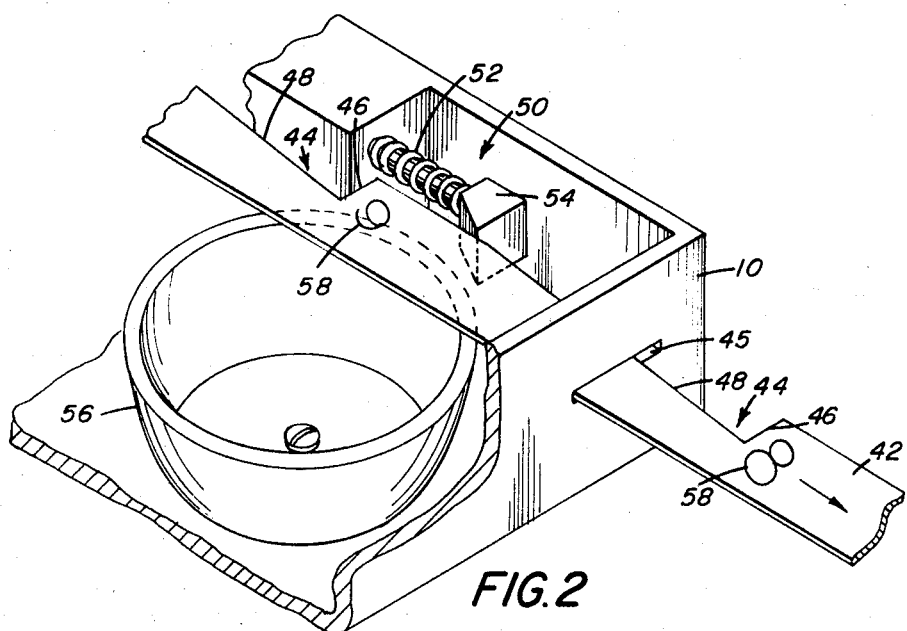
FIG. 2 is an enlarged segmental perspective view of a portion of the structure of FIG. 1.

With reference to FIGS. 1 and 2, one embodiment of the strip metering mechanism is shown in combination with a film pack of the type for use in cameras of the instant processing type. The film pack essentially comprises a casing 10, a roll film metering assembly 12, and a cover 14. The casing 10 has an aperture 16 through which a film 18 of the roll film metering assembly 12 may be exposed, and parallel, spaced ribs 20, 21 on each side of aperture 16 having paired cut-outs 22a–e for supporting the roll film metering assembly 12. The cut-outs 22e are adapted to provide bearing support for an axle 23 of a roll 24 of conventional photographic film 18. The film roll 24 may have a cover sheet leader and trailer, not shown, to protect the film from exposure when the film pack is out of the camera. Guide bars 26, 28 serve to hold film 18 flat within the exposure plane, and such guide bars are supported within cut-outs 22c and 22d respectively. After exposure, the film 18 is wound onto a take-up spool 30 having an axle 32 which is supported within cut-outs 22a. A pinion gear 34 is mounted on axle 32 and is adapted to mesh with a metering drive gear 36 on a drive shaft 38 supported within cut-outs 22b.

In order to advance successive predetermined increments of unexposed film 18 in correct register with the exposure aperture 16, the film pack is provided with one embodiment of a strip metering mechanism as shown in FIGS. 1 and 2 comprising a metering strip 42 wound in roll form 43 on axle 38. The strip extends through an opening 45 in casing 10, and is provided with notches 44 along one edge, one notch for each length of film to be advanced, and each notch 44 has a shoulder portion 46 and a ramp portion 48 for actuating an audible signal generating mechanism 50 when strip 42 is pulled. The audible signal generating mechanism 50 comprises a helical spring 52 having one end secured to the casing 10 and a clapper 54 on its opposite end adapted to ride on the edge of strip 42. When the strip is pulled to advance an unexposed length of film 18 in register with the exposure aperture 16, the ramp portion 48 initially cams the clapper 54 outwardly tensioning spring 52, and the strip edge releases the clapper when shoulder portion 46 is moved past the end of clapper 54. The released clapper 54 swings inwardly striking a metal bell 56 secured to casing 10 indicating the the film 18 has been advanced a correct length and that the strip 42 should not be moved any further. The strip is further provided with indicia 58 in the form of numbers to indicate the number of the exposure to be made. The notches 44 in strip 42 are longitudinally spaced apart different distances to compensate for the gradually increasing diameter of film 18 on take-up spool 30, and the decreasing diameter of the strip roll 43 on shaft 38, and thus assuring that the exposure frames will be evenly spaced along the length of film 18.

Figure 3:
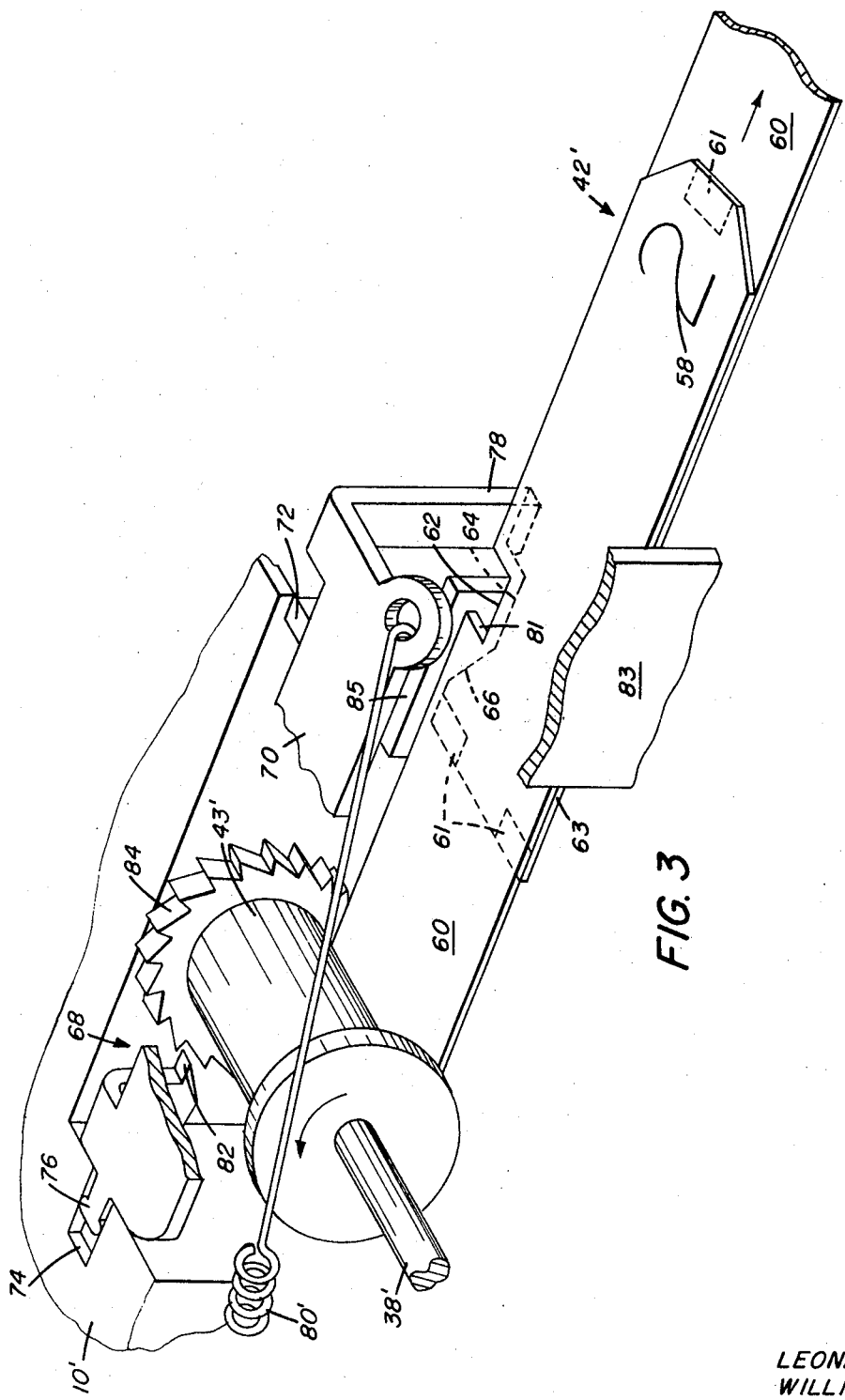
FIG. 3 is a segmental, perspective view illustrating another embodiment of a strip metering mechanism of this invention in an unlocked position.

In the embodiment of the invention shown in FIG. 3, parts similar to parts illustrated in FIGS. 1 and 2 will be denoted by the same numerals primed. In this embodiment, the roll film metering assembly is similar to the assembly 12 shown in FIG. 1, and the metering strip 42' comprises a plurality of pull tabs 60 in which the leading and trailing ends of successive tabs are placed in overlapped relation and releasably sealed together at 61 by any suitable means such as cement or ultrasonically. The leading end 59 of each tab 60 is provided with indicia 58 in the form of numerals indicating the number of the exposure to be made. In this embodiment, the leading end 59 of each tab 60 is provided with a notch 62 along one edge, and the corresponding trailing end 63 of a leader in the case of the first tab or of a leading tab in the case of succeeding adjacent tabs is provided with an edge notch 64, shown dotted, in register with notch 62. Notch 64 has a ramp portion 66, and the notches 62, 64 act in concert to control a locking mechanism 68. The locking mechanism comprises a plate 70 that is guided for reciprocal and pivotal movement by a support shelf 72 and guide slot 74 in the casing 10'. One end of plate 70 has a substantially elliptical projection 76 extending into slot 74 to permit pivotal and longitudinal movement of plate 70, and its opposite end provided with a downwardly extending arm 78 which is biased by a spring 80' into engagement with one edge of strip 42. Accordingly, when strip 42' is pulled to advance film 18, the arm 78 enters notches 62, 64 just before the film is advanced a correct increment to place an unexposed area of film 18 in register with exposure aperture 16. Continued movement of the film strip 42' causes an edge 81 of notch 62 to engage and force arm 78 and plate 70 in the direction of movement of the strip causing a locking pawl 82 on plate 70 to engage a ratchet wheel 84 secured to one end of shaft 38'. This locking of the film 18 and strip 42 occurs at the instant that the film has been advanced the correct length. Since shaft 38' is now locked, all load is transferred to seals 61 which now break. As the leader of lead tab 60 is detached from the strip 42, the ramp portion 66 on its trailing end 63 which is guided between spaced flanges 83, 85 engages and cams arm 78 outwardly out of notch 62 for releasing plate 70. The released plate is urged by spring 80' to its normal position seen in FIG. 3 in which arm 78 is in engagement with the edge of strip 42, and locking pawl 82 is disengaged from ratchet 84. The film has now been metered, and is ready for next exposure.

In the embodiment of the invention shown in FIGS. 4 and 5, parts similar to parts shown in the previous Figures will be denoted by the same numerals primed. In this embodiment, the casing 10' and roll film metering assembly 12' are structurally different than the corresponding parts of FIG. 1 in order to support shaft 38' having axially spaced portions for taking up film 18' and metering strip 42' in roll form. In this embodiment, the casing 10' and film metering assembly 12' would have to be altered to locate shaft 38' in slots 22e near the slit opening 45' of casing 10' (FIG. 5), and film roll shaft 23' and film roll 24' (not shown) would be located in slots 22a near the rear of casing 10'. Plate 70' is of a slightly different configuration than plate 70 (FIG. 3), and is guided at one end relative to casing 10' by a pin 86 and slot 88 connection, and in addition has a depending lug 90 adapted when released to ride on an edge of film 18'. A long notch 62' is provided in the leading end 59' of each tab in register with a notch 64' in the trailing end 63' of a leader in the case of the first tab and a lead tab in the case of succeeding adjacent tabs, and as soon as notches 62', 64' are moved into register with an arm 92 on plate 70', spring 80' pivots the plate causing lug 90 to engage an edge of film 18'. The notches 62', 64' are properly positioned on strip 42' so that this action occurs just prior to the advance of the film to its correct exposure position. At an instant before film 18' is advanced the correct increment, lug 90 enters a notch 94 in the film and further advance of strip 42' and the film 18' forces locking pawl 82' into locking engagement with ratchet 84', preventing any further advance of strip 42' or film 18'. At this instant, the film 18' has been advanced a correct increment for an exposure. Continued pulling on the lead pull tab 60' detaches it from metering strip 42', and ramp portion 66' at one end of notch 64' on trailing end 63' which is guided between spaced flanges 83', 85' cams arm 92 outwardly releasing plate 70'. Spring 80' returns plate 70' to its normal position seen in FIGS. 4 and 5 in which arm 92 is in engagement with the edge of strip 42' and lug 90 is out of engagement with the edge of film 18'. The film is now ready for exposure.

The invention has been described in detail with particular reference to preferred embodiments thereof, but it will be understood that variations and modifications can be effected within the spirit and scope of the invention as described hereinabove.

We claim:

1. In a strip-metering mechanism coupled to a film for automatically successively metering the film a predetermined increment, the combination comprising:
   means for supporting a film to be metered;
   means including a pull strip disengaged from the film but coupled to the film supporting means and adapted when said pull strip is pulled to advance the film; and
   means continuously biased into engagement with said pull strip and responsive to said pull strip as it is pulled for indicating when said pull strip has advanced the film a predetermined increment.

2. The invention according to claim 1 wherein said means responsive to said pull strip comprises a signal-generating means.

3. The invention according to claim 1 wherein said means responsive to said pull strip comprises a signal-generating means, said pull strip having means for conditioning said signal-generating means for operation, and means on said pull strip for operating the conditioned signal-generating means whereby a signal is generated indicating that said pull strip has advanced the film a predetermined increment.

4. The invention according to claim 3 wherein said signal-generating means comprises a bell and a spring having a fixed end and a clapper secured to the opposite end adapted to ride on an edge of said pull strip, said conditioning means on said pull strip comprises a ramp on said edge for moving said clapper to tension said spring, and said operating means on said pull strip comprises a notch adjacent said ramp for releasing said tensioned spring causing said clapper to strike said bell generating an audible signal.

5. The invention according to claim 1 wherein said means responsive to said pull strip comprises a strip-locking means movable between locked and unlocked positions.

6. The invention according to claim 1 wherein said pull strip comprises detachable tabs in which a trailing end portion of a lead tab is releasably connected in overlapped relation to the leading end portion of a succeeding tab, said means responsive to said pull strip comprises a strip-locking means movable between locked and unlocked positions, said pull strip having first means on said overlapped end portions for moving said strip-locking means to its locked position at the instant said pull strip has advanced the film a predetermined increment, and second means on said trailing end portion adapted when said lead tab is detached from said succeeding tab to release said locked strip-locking means for movement to its unlocked position.

7. The invention according to claim 6 wherein said pull strip is wound on a shaft to which a ratchet is secured, said strip-locking means comprises a reciprocally and pivotally movable plate having an arm biased by a spring into engagement with said pull strip, said plate having a pawl engageable with said ratchet, said first means comprises a notch engageable by said arm and adapted upon movement of said pull strip to move said plate and urge said pawl into locking engagement with said ratchet, and said second means comprises a ramp for camming said arm outwardly releasing said plate which is moved by said spring unlocking said pawl from said ratchet.

8. The invention according to claim 7 wherein said notch is in the edge of said overlapped leading and trailing end portions of succeeding tabs, and said ramp is on said trailing end portion of a tab.

9. The invention according to claim 1 wherein said pull strip comprises detachable tabs in which a trailing end portion of a lead tab is releasably connected in overlapped relation to the leading end portion of a succeeding tab, said means responsive to said pull strip comprises strip-locking means movable between locked and unlocked positions, means on an edge of said film adapted upon movement of said film to engage and move said strip-locking means to its locked position, first means on the overlapped portion of said tabs for unlocking said strip-locking means so that it is free to move into engagement with said edge of said film, and second means on said trailing end portion of a tab adapted when the tab is detached from said strip to release said locked strip-locking means for movement to its unlocked position.

10. The invention according to claim 9 wherein said pull strip is wound on a shaft to which a ratchet is secured, said strip-locking means comprises a reciprocally and pivotally movable plate having a first arm biased by a spring into engagement with said pull strip and a second arm biased by said spring into engagement with said film, said plate having a pawl engageable with said ratchet, said first means on said strip comprises a first notch engageable by said first arm, said engaging and moving means on said film comprises a second notch engageable by said second arm and adapted upon movement of said film to move said plate and urge said pawl into locking engagement with said ratchet, and said second means on said strip comprises a ramp on said trailing end portion of a tab adapted when the tab is detached from the strip to cam said first arm outwardly withdrawing said second arm from said second notch for releasing said plate for movement by said spring unlocking said pawl from said ratchet.

* * * * *